(12) United States Patent
Ricchuiti et al.

(10) Patent No.: US 12,254,114 B2
(45) Date of Patent: *Mar. 18, 2025

(54) SYSTEMS AND METHODS FOR DATA SECURITY AND FRAUD PREVENTION IN COLLABORATIVE EDITING ENVIRONMENTS

(71) Applicant: Capital One Services, LLC, McLean, VA (US)

(72) Inventors: Andrew Ricchuiti, Dallas, TX (US); Mark Morrison, Plano, TX (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/234,264

(22) Filed: Aug. 15, 2023

(65) Prior Publication Data

US 2024/0160784 A1 May 16, 2024

Related U.S. Application Data

(63) Continuation of application No. 17/175,325, filed on Feb. 12, 2021, now Pat. No. 11,763,031.

(51) Int. Cl.
*G06F 21/62* (2013.01)
*G06Q 40/03* (2023.01)
(Continued)

(52) U.S. Cl.
CPC ...... *G06F 21/6254* (2013.01); *G06F 21/6263* (2013.01); *G06Q 40/03* (2023.01);
(Continued)

(58) Field of Classification Search
CPC ............ G06F 21/6254; G06F 21/6263; G06F 3/0482; G06Q 40/025; H04L 51/08;
(Continued)

(56) References Cited

U.S. PATENT DOCUMENTS 7,293,033 B1 11/2007 Tormasov et al.
7,526,472 B2 4/2009 Heidloff et al.
(Continued)

FOREIGN PATENT DOCUMENTS

CA 2357966 A1 4/2003
EP 1569098 A2 8/2005
(Continued)

*Primary Examiner* — Cheikh T Ndiaye
(74) *Attorney, Agent, or Firm* — HUNTON ANDREWS KURTH LLP

(57) ABSTRACT

A data security and fraud prevention system is configured to transmit a web form to a first device, receive through the web form first data including first user private data associated with a first user, receive a request to share the web form with a second user, create a cache storage and an unique identifier associated with the web form, and mask the first user private data to prevent access to the first user private data by the second user. The data security and fraud prevention system is further configured to encrypt the unique identifier, generate a share session between the first device and a second device associated with the second user, receive through the web form second data including second user private data associated with the second user, mask the second user private data to prevent access to the second user private data by the first user, and aggregate the first data and the second data to complete the web form.

19 Claims, 9 Drawing Sheets

(51) Int. Cl.
*H04L 9/40* (2022.01)
*H04L 51/08* (2022.01)
*H04L 67/02* (2022.01)
*H04L 67/568* (2022.01)
*H04W 12/02* (2009.01)
*G06F 3/0482* (2013.01)

(52) U.S. Cl.
CPC .............. *H04L 51/08* (2013.01); *H04L 63/10* (2013.01); *H04L 67/02* (2013.01); *H04L 67/568* (2022.05); *H04W 12/02* (2013.01); *G06F 3/0482* (2013.01)

(58) Field of Classification Search
CPC ....... H04L 63/10; H04L 67/02; H04L 67/568; H04W 12/02
See application file for complete search history.

(56) References Cited

U.S. PATENT DOCUMENTS

| | | | |
|---|---|---|---|
| 7,783,665 | B1 | 8/2010 | Tormasov et al. |
| 7,933,956 | B2 | 4/2011 | Hon et al. |
| 8,015,596 | B2 | 9/2011 | Wray |
| 8,191,152 | B1 * | 5/2012 | Barker ................ G06Q 40/00 |
| | | | 704/244 |
| 8,666,759 | B2 | 3/2014 | Eckert et al. |
| 9,692,840 | B2 | 6/2017 | Fushman et al. |
| 10,887,633 | B1 | 1/2021 | Stolarz et al. |
| 2003/0065722 | A1 | 4/2003 | Ieperen |
| 2005/0182773 | A1 | 8/2005 | Feinsmith |
| 2007/0174454 | A1 | 7/2007 | Mitchell et al. |
| 2011/0161824 | A1 | 6/2011 | Coldefy et al. |
| 2011/0239131 | A1 | 9/2011 | Koren |
| 2012/0124458 | A1 | 5/2012 | Cruzada |
| 2014/0012922 | A1 | 1/2014 | Wu |
| 2014/0101261 | A1 * | 4/2014 | Wu ................ H04L 12/1818 |
| | | | 709/206 |
| 2014/0108542 | A1 * | 4/2014 | Cheng ................ H04L 67/306 |
| | | | 709/204 |
| 2014/0325331 | A1 | 10/2014 | Madireddi et al. |
| 2015/0319200 | A1 | 11/2015 | Nguyen et al. |
| 2019/0222562 | A1 | 7/2019 | Ziebell |
| 2020/0043102 | A1 | 2/2020 | Eftekhari et al. |
| 2021/0064779 | A1 | 3/2021 | Krishnan et al. |
| 2021/0241371 | A1 * | 8/2021 | Diana ................ G06F 40/56 |

FOREIGN PATENT DOCUMENTS

| | | |
|---|---|---|
| GB | 2432238 A | 5/2007 |
| WO | 2001069384 A2 | 9/2001 |
| WO | 2012131429 A1 | 10/2012 |
| WO | 2015025189 A1 | 2/2015 |
| WO | 2015036817 A1 | 3/2015 |
| WO | 2016073469 A1 | 5/2016 |
| WO | 2019021048 A1 | 1/2019 |

\* cited by examiner

Refinance Application Form

Primary Applicant

Full Name: 410 David Smith

SSN: 420 XXXXXX

Co-Applicant

Full Name: 430 Sarah Smith

SSN: 440

450 Share Form

Refinance Application Form

Primary Applicant

Full Name: David Smith — 610
SSN: XXXXXX — 620

Co-applicant

Full Name: Sarah Smith — 630
SSN: ****** — 640

Share Form — 650

SYSTEMS AND METHODS FOR DATA SECURITY AND FRAUD PREVENTION IN COLLABORATIVE EDITING ENVIRONMENTS

CROSS-REFERENCE TO RELATED APPLICATION

The subject application is a continuation of U.S. patent application Ser. No. 17/175,325 filed Feb. 12, 2021, the contents of which is hereby incorporated by reference in their entirety.

FIELD OF THE INVENTION

The present disclosure relates generally to data security technology, and more particularly, to systems and methods of data security and fraud prevention in collaborate editing environments, such as web-based forms.

BACKGROUND

Collaborative editing, such as the submission of online electronic web forms, is becoming increasingly widespread and common. The web forms may include forms for various purposes, for example, automobile loan application forms, real estate mortgage loan application forms, credit card application forms, and so forth. Those web forms may require applicants or borrowers to enter private data, such as, date of birth, social security number, and personal income. The private data needs to be secured such that a third party is not allowed to access such private data.

In some cases, a web loan form or prequalification form (e.g., a refinance application form) may require private data of both a primary applicant and a co-applicant. Oftentimes, the primary applicant fills out the web form without the co-applicant being around or without the co-applicant's private data being available that is needed to complete the web form. However, the co-applicant generally does not feel secure to provide his or her private data directly to the primary applicant either through a text message or over a phone conversation. As such, the primary applicant may often fail to finish the web form because he or she does not have the co-applicant's information that is required for completing the web form.

Accordingly, there is a need to provide systems and methods of completing a web form or otherwise performing collaborative editing by a first user and a second user while improving data security and preventing fraud.

SUMMARY

Embodiments of the present disclosure provide a system for data security and fraud prevention. The data security and fraud prevention system comprises a processor and a memory storing instructions executable by the processor. Upon execution of the instructions by the processor, the processor is configured to: transmit a web form to a first device upon receipt of a request to access the web form from the first device; receive, through the web form, first data from the first device, the first data including first user private data associated with a first user; receive, from the first device, a request to share the web form with a second user; create a cache storage and an unique identifier, wherein the unique identifier associates the cache storage with the web form and the first data is stored in the cache storage; mask the first user private data to prevent access to the first user private data by the second user; encrypt the unique identifier; generate a share session between the first device and a second device, wherein the second device is associated with the second user; receive, through the web form, second data from the second device, wherein the second data includes second user private data associated with the second user; store the second data in the cache storage with reference to the unique identifier; mask the second user private data to prevent access to the second user private data by the first user; and aggregate the first data and the second data to complete the web form.

Embodiments of the present disclosure provide a device for data security and fraud prevention. The device comprises a processor, a memory, and a web browser. The processor is configured to: receive, via the web browser, a web form from a server; receive, through the web form, first data, the first data including first user private data associated with a first user; transmit, via the web browser, the first data to the server; receive, from the first user, a request to share the web form with a second user; transmit, via the web browser, the request to share the web form to the server by calling an application programming interface (API); receive, from the server, an encrypted unique identifier, the unique identifier associated with the web form; generate a share universal resource locator (URL) link for sharing the web form based on the encrypted unique identifier via a share API of the web browser; generate a message associated with the URL link; and transmit the URL link and the message to a user device, wherein the user device is associated with the second user.

Embodiments of the present disclosure provide a method for data security and fraud prevention. The method for data security and fraud prevention comprises: transmitting a web form from a server to a first device upon a request to access the web form; receiving, by the server through the web form, first data, wherein the first data includes first user private data associated with a first user; receiving by the server, a request to share the web form with a second user; creating, by the server, a cache storage and an unique identifier, wherein the unique identifier associates the cache storage with the web form and the first data is stored in the cache storage; masking, by the server, the first user private data to prevent access to the first user private data by the second user; encrypting, by the server, the unique identifier; generating, by the server, a share session between the first device and a second device, wherein the second device is associated with the second user; receiving, by the server through the web form, second data, wherein the second data includes second user private data associated with the second user; storing, by the server, the second data in the cache storage with reference to the unique identifier; masking, by the server, second user private data to prevent access to the second user private data by the first user; and aggregating, by the server, the first data and the second data to complete the web form.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

FIG. 4 is an example schematic web form according to an example embodiment.

FIG. 6 is an example schematic web form masking private data according to an example embodiment.

DETAILED DESCRIPTION OF EXAMPLE EMBODIMENTS

Figure 1:
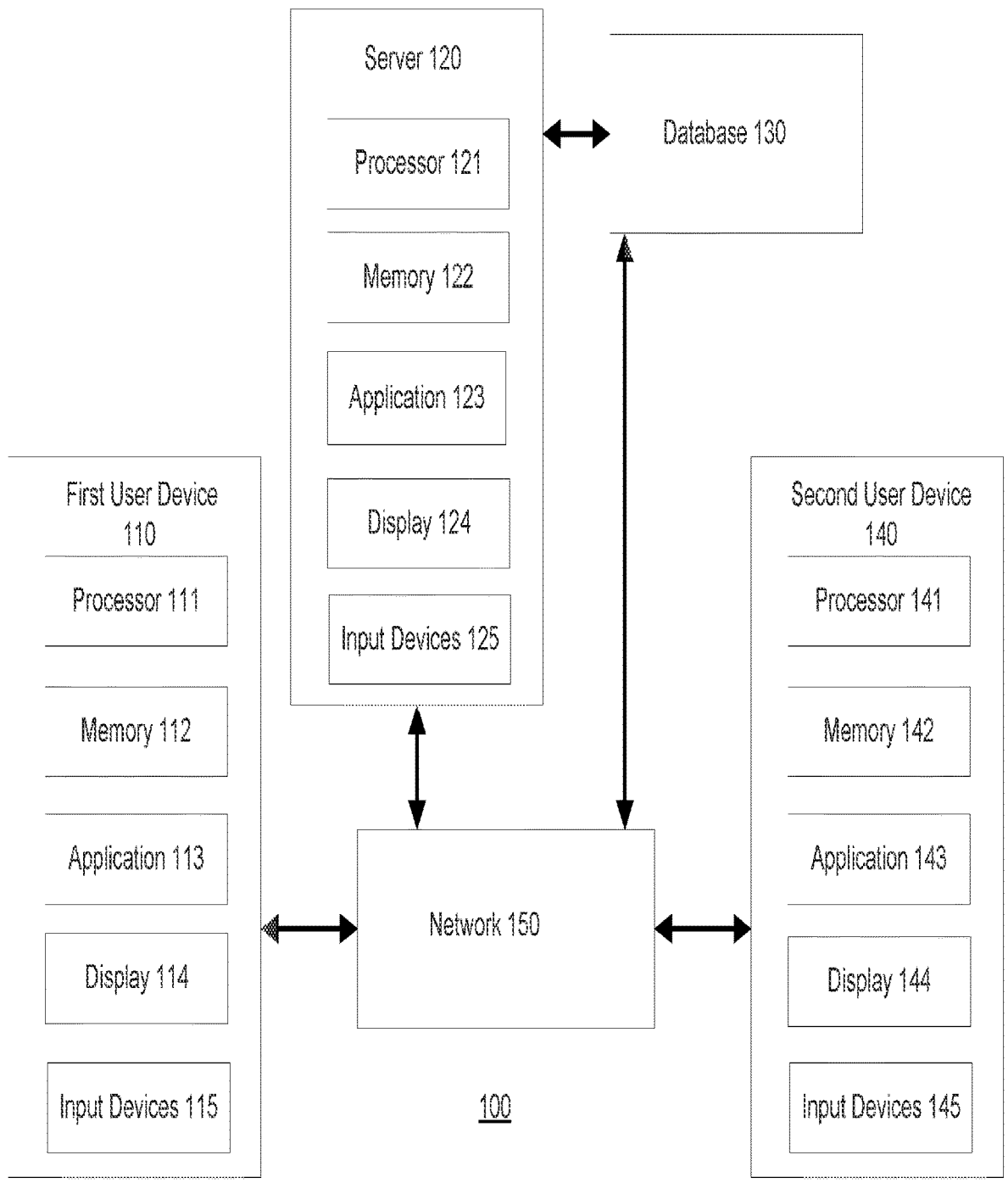
FIG. 1 is a diagram of a system for web form data security according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Collaborative editing occurs frequently in computer-based activities. For example, when a user is submitting information in the course of electronic commerce or other transaction, information from an additional person may be required. For example, when completing an online web form, such as a refinance application form, the primary applicant may apply with a co-applicant and have to submit the co-applicant's information. Some form fields collect private data that may include, without limitation, a social security number (SSN), birth date, account number, account data, financial information, medical information, educational information, contact information, and/or other sensitive or personally-identifiable information. Given the sensitivity of this information, the co-applicant may not be willing to share his or her private data with the primary applicant. Also, in instances where the co-applicant is not present with the primary applicant, the co-applicant may not be willing transmit his or her private data through an unsecure communication, such as a text message, an email, or a telephone conversation. As such, the primary applicant may fail to complete the online application due to lack of the co-applicant's private data. Systems and methods provided herein allow for sending and sharing a web session of the online application to allow both applicants to complete the web form without revealing private data. For example, while the primary applicant may be notified to be able to view the co-applicant completing the web form, the private data of the co-applicant can be masked from the primary applicant to maintain the security of the private data (and the same can be applied to the private data of the primary application). Accordingly, systems and methods provided herein enable both the primary applicant and the co-applicant to complete the web form without data security concerns.

Specifically, data streams and web sockets may be used in this disclosure to allow the primary applicant and the co-applicant to edit the online web form through a shared link. A sharable link to the web form may be created for the primary applicant to send to the co-applicant, such that the primary applicant and the co-applicant may complete the web form at the same time. In this way, the applicants can directly input private data on the web form without fear of outside parties, as well as other applicant, from viewing the private data.

In addition, after the web form application is evaluated and approved, one or more offers associated with the application may be generated and transmitted to the primary applicant. The primary applicant may request validation from the co-applicant or other persons before selecting an offer. The systems and methods disclosed herein may generate a link in each offer that allows the primary applicant to share the offer with the co-applicant or other persons, for example, through a text message or an email. This can result in increased convenience and allow the primary applicant to more easily share the offers with the co-applicant or other persons, while maintaining a high level of data security.

The present disclosure can be advantageously applied to additional collaborative editing purposes to promote data security, information control, and usability. Exemplary additional collaborative editing purposes include, without limitation, computer programming and software development (e.g., black box routines, function libraries), document and manuscript preparation and editing, data logging, and review comments and mark-up.

FIG. 1 illustrates a system 100 for web form data security and fraud prevention according to an example embodiment. As further discussed below, the system 100 may include a first user device 110, a server 120, a database 130, and a second user device 140 in communication with one another using a network 150. Although FIG. 1 illustrates single instances of the components, the system 100 may include any number of components.

The first user device 110 may be configured to have a web browser in which a browser extension may be installed and/or a mobile application. A user may use the web browser on the first user device 100 to communicate with the server 120 to request, receive and complete an online web form, for example, for an auto loan application, a refinance application, or a home mortgage application. The first user device 110 may be configured to transmit a shared link of the web form to the second user device 140. The server 120 may be configured to receive data of the web form from the first user device 110 and the second user device 140, and to facilitate generation of the shared link of the web form. The database 130 may contain data associated with the web form.

The first user device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The first user device 110 may include a processor 111, a memory 112, and an application 113. The processor 111 may be a processor, a microprocessor, or other processor, and the first user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 112 may be configured to store one or more software applications, such as the application 113, and other data, such as user's private data and financial account information.

The application 113 may comprise one or more software applications, such as a mobile application and a web browser, comprising instructions for execution on the first user device 110. In some examples, the first user device 110 may execute one or more applications, such as software applications, that enable, for example, network communications with one or more components of the system 100, transmit and/or receive data, and perform the functions described herein. Upon execution by the processor 111, the application 113 may provide the functions described in this specification, specifically to execute and perform the steps and functions in the process flows described below. Such processes may be implemented in software, such as software modules, for execution by computers or other machines. The application 113 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The first user device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, touch-screen, microphone, digital camera, video recorder or camcorder. These devices may be used to enter information and interact with the software and other devices described herein.

The server 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include a processor 121, a memory 122, and an application 123. The processor 121 may be a processor, a microprocessor, or other processor, and the server 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the server 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as user's private data and financial account information.

The application 123 may comprise one or more software applications comprising instructions for execution on the server 120. In some examples, the server 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. For example, the application 123 may be executed to perform receiving web form data from the first user device 110 and the second user device 140, retaining a web session between the first user device 110 and the second user device 140, and masking private data received from the first user device 110 and the second user device 140. Such processes may be implemented in software, such as software modules, for execution by computers or other machines. The application 123 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the server 120 that is available and supported by the server 120, such as a touch-screen, keyboard, mouse, cursor-control device, touch-screen, microphone, digital camera, video recorder or camcorder. These devices may be used to enter information and interact with the software and other devices described herein.

The database 130 may be one or more databases configured to store data, including without limitation, private data of users, financial accounts of users, identities of users, transactions of users, and certified and uncertified documents. The database 130 may comprise a relational database, a non-relational database, or other database implementations, and any combination thereof, including a plurality of relational databases and non-relational databases. In some examples, the database 130 may comprise a desktop database, a mobile database, or an in-memory database. Further, the database 130 may be hosted internally by the server 120 or may be hosted externally of the server 120, such as by a server, by a cloud-based platform, or in any storage device that is in data communication with the server 120.

The second user device 140 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second user device 140 may include a processor 141, a memory 142, and an application 143. The processor 141 may be a processor, a microprocessor, or other processor, and the second user device 140 may include one or more of these processors. The processor 141 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 141 may be coupled to the memory 142. The memory 142 may be a read-only memory, write-once read-multiple memory or read/write memory, e.g., RAM, ROM, and EEPROM, and the second user device 140 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 142 may be configured to store one or more software applications, such as the application 143, and other data, such as user's private data and financial account information.

The application 143 may comprise one or more software applications comprising instructions for execution on the second user device 140. In some examples, the second user device 140 may execute one or more applications, such as software applications, that enable, for example, network communications with one or more components of the system 100, transmit and/or receive data, and perform the functions described herein. Upon execution by the processor 141, the application 143 may provide the functions described in this specification, specifically to execute and perform the steps and functions in the process flows described below. For example, the application 143 may be executed to receive push notifications from the first user device 110. Such processes may be implemented in software, such as software modules, for execution by computers or other machines. The application 143 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The second user device 140 may further include a display 144 and input devices 145. The display 144 may be any type of device for presenting visual information such as a computer monitor, a flat panel display, and a mobile device screen, including liquid crystal displays, light-emitting diode displays, plasma panels, and cathode ray tube displays. The input devices 145 may include any device for entering information into the second user device 140 that is available and supported by the second user device 140, such as a touch-screen, keyboard, mouse, cursor-control device, touch-screen, microphone, digital camera, video recorder or camcorder. These devices may be used to enter information and interact with the software and other devices described herein.

The system 100 may include one or more networks 150. In some examples, the network 150 may be one or more of a wireless network, a wired network or any combination of wireless network and wired network, and may be configured to connect the first user device 110, the server 120, the database 130 and the second user device 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the first user device 110, the server 120, the database 130, and the second user device 140 using the network 150 may occur using one or more front channels and one or more secure back channels. A front channel may be a communication protocol that employs a publicly accessible and/or unsecured communication channel such that a communication sent to the first user device 110, the server 120, the database 130, and/or the second user device 140 may originate from any other device, whether known or unknown to the first user device 110, the server 120, the database 130, and/or the second user device 140, if that device possesses the address (e.g., network address, Internet Protocol (IP) address) of the first user device 110, the server 120, the database 130, and/or the second user device 140. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the first user device 110, the server 120, the database 130, and/or the second user device 140 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

Figure 2A:
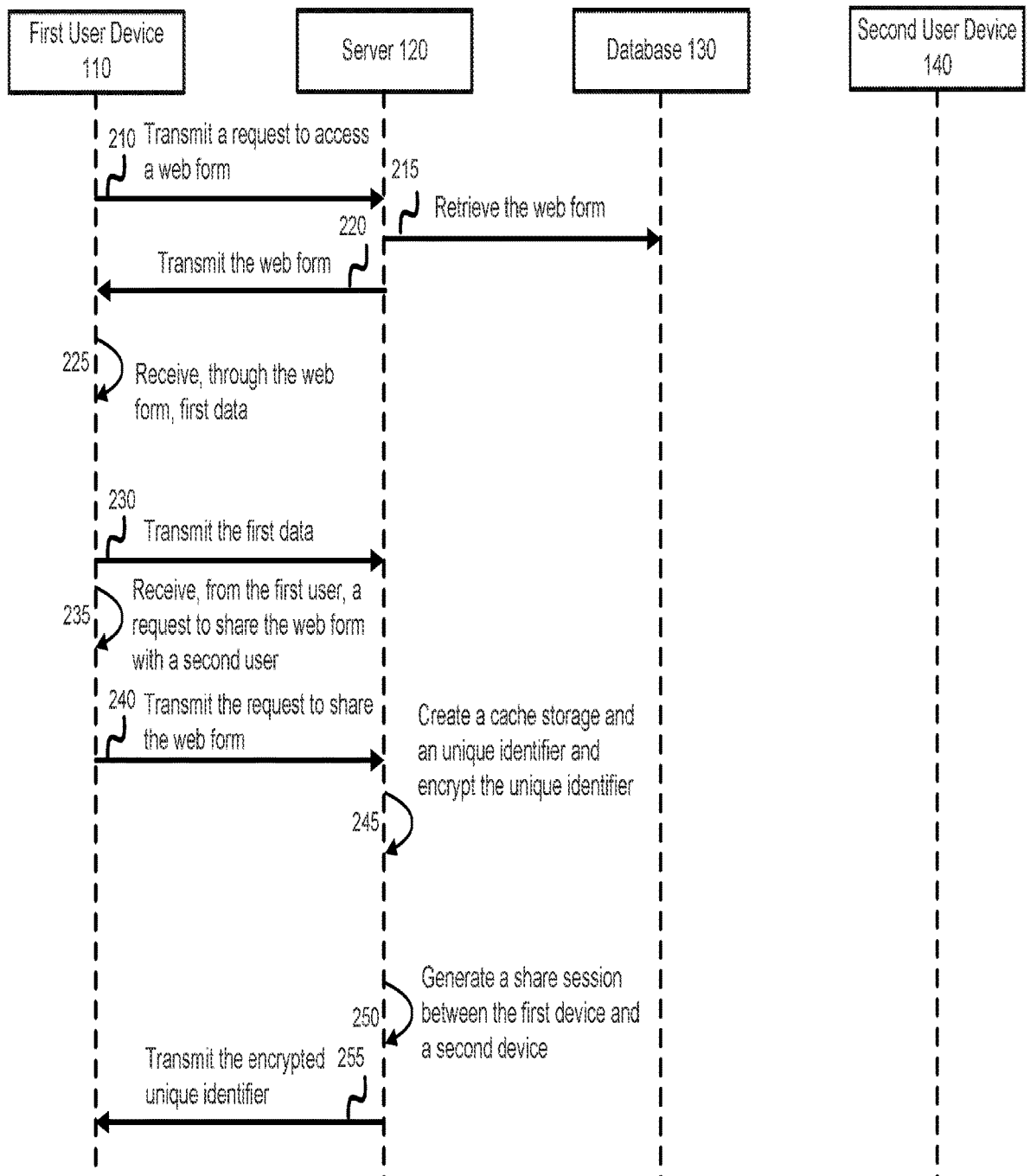
FIG. 2A is a sequence chart illustrating a method of web form data security according to an example embodiment.

FIG. 2A illustrates a sequence diagram 200 of data security for a web form according to an example embodiment. FIG. 2A may reference the same or similar components as those illustrated in FIG. 1, including a first user device, a server, a database, a second user device and a network.

In step 210, the first user device 110 may transmit a request to access a web form to the server 120. When a user of the first user device 110 wants to apply for, for example, a refinance application, the user of the first user device 110 may visit a website of a financial institution hosted on the server 120. The user (referred to as a primary applicant hereafter) may request a web form for the refinance application to complete the web form online. For example, the primary applicant may click an "apply" button on the website of the financial institution and start loading the web form.

In step 215, upon receiving the request, the server 120 may retrieve the web form from the database 130, which is associated with the financial institution. The database 130 may further contain personal data of the primary applicant, such as name, home address, phone number, date of birth, and a financial account associated with the primary applicant, if the primary applicant is a past or current customer of the financial institution.

In step 220, the server 120 may transmit the web form to the first user device 110 upon retrieving the web form from the database 130. The web form may be displayed in a web browser on the first user device 110.

In step 225, the first user device 110 may receive, through the web form, first data. The first data include information about the primary applicant required by the web form. For example, the primary applicant may enter his or her name, home address, phone number, working place, annual income, date of birth, and so forth in the corresponding field on the web form. The first data may include first user private data associated with the primary applicant.

The web form may be divided into different sections. The primary applicant may complete information (e.g., personal information including private data) and then review it. The web form may include a co-applicant section in which the co-applicant's information is needed for evaluating the refinance application. The co-applicant section may include a share link (e.g., a button indicative of sharing the web form) so that when the co-applicant is desired, the primary applicant is provided with the option to create a link and send it through, for example, the first user device's short message service (SMS) or email, to the co-applicant.

The web form may specify sections and/or individual input fields for completion by the primary applicant and may specify sections and/or individual input fields for completion by the co-applicant. In some examples, the primary applicant and co-applicant may designate one or more sections or one or more individual input fields for completion by themselves or by the applicant. For example, the primary applicant may designate a section for the co-applicant to complete, and in another example, the co-applicant may specify an individual input field for completion by the primary applicant. In either example, the section or input field can be designated as containing private data by either party (i.e., the party designating the field or the party completing the field) in order to shield the submitted data from the other party. This designation may function as a request for the completion of the section or input field by the designated party in accordance with the systems and methods disclosed herein.

In step 230, the first user device 110 may transmit the first data received through the web form to the server 120. The server 120 may store the first data on the database 130 or in a local storage associated with the server 120.

In step 235, the first user device 110 may receive, from the first user (the primary applicant), a request to share the web form with a second user (the co-applicant). The web form may include fields associated with the co-applicant. As described above, the primary applicant may want the co-applicant which whom the primary applicant applies for the refinance application, to complete the co-applicant information required by the web form. The primary applicant may make a request of sharing the web form with the co-applicant, for example, by clicking on a button on the web form indicative of sharing the web form. Through sharing the web form, the co-applicant can access the web form and supply his or her own information, which may secure the personal data of the co-applicant and can also prevent fraud.

In step 240, the first user device 110 may transmit the request to share the web form to the server 120. For example, upon clicking on the button on the web form, the request can be automatically transmitted to the server 120.

In step 245, upon receipt of the request to share the web form, the server 120 may create a cache storage and a unique identifier. The unique identifier may be a value, such as a numeric value or an alphanumeric string, or the unique identifier may be a software object. For example, the unique identifier may be created by the server 120 and the server 120 may attach the unique identifier as a key value for the cache storage. As another example, the server 120 may create the unique identifier by generating a 128-bit alphanumeric string through a random generator per character. As a further example, the server 120 may create the unique identifier algorithmically, e.g., using an algorithm to generate the unique identifier value. The algorithm may be designed to yield a predetermined result or a result within a predetermined range including, without limitation, results having a certain number or range of characters, a certain number or range of digits, a certain number or range of letters, a certain number or range of special characters, and a certain value or range. As a further example, the unique identifier may be retrieved from a database.

The cache storage may be created using by the server 120 in a local operation and/or by access external storage resources (e.g., an external database and/or server). The unique identifier associates the cache storage with the web form and the first data associated with the primary applicant may be stored in the cache storage. For example, the web form data may be moved through an external resource first to maintain high speed of updates until the primary applicant abandons the cache storage or submits the web form. The server 120 may also encrypt the unique identifier.

In some embodiments, when the primary applicant would want to create a shared link to share the web form, an application programming interface (API) call may be sent to the back-end server 120 that would create the cache storage as well as the unique identifier for that cache storage, upon clicking on the button in the web form by the primary applicant.

In step 250, the server 120 may generate a share session between the first user device and the second user device. The second user device is associated with the second user (the co-applicant). By maintaining the share session valid, both the primary applicant and the co-applicant can edit the same web form at the same time or at different times.

In step 255, the server 120 may transmit the encrypted unique identifier to the first user device 110. The first user device 110 may store the encrypted unique identifier in a local storage (e.g., the memory 112) associated with the first user device 110.

In some embodiments, the share session created by the server 120 may include a web socket between the server and the two devices filling out the web form. In this way, when one person is filling out the web form, the data can be pushed to the server 120, which then sends it to the other device. The primary applicant and the co-applicant can start to see where each other is in the process and filling out what.

Figure 2B:
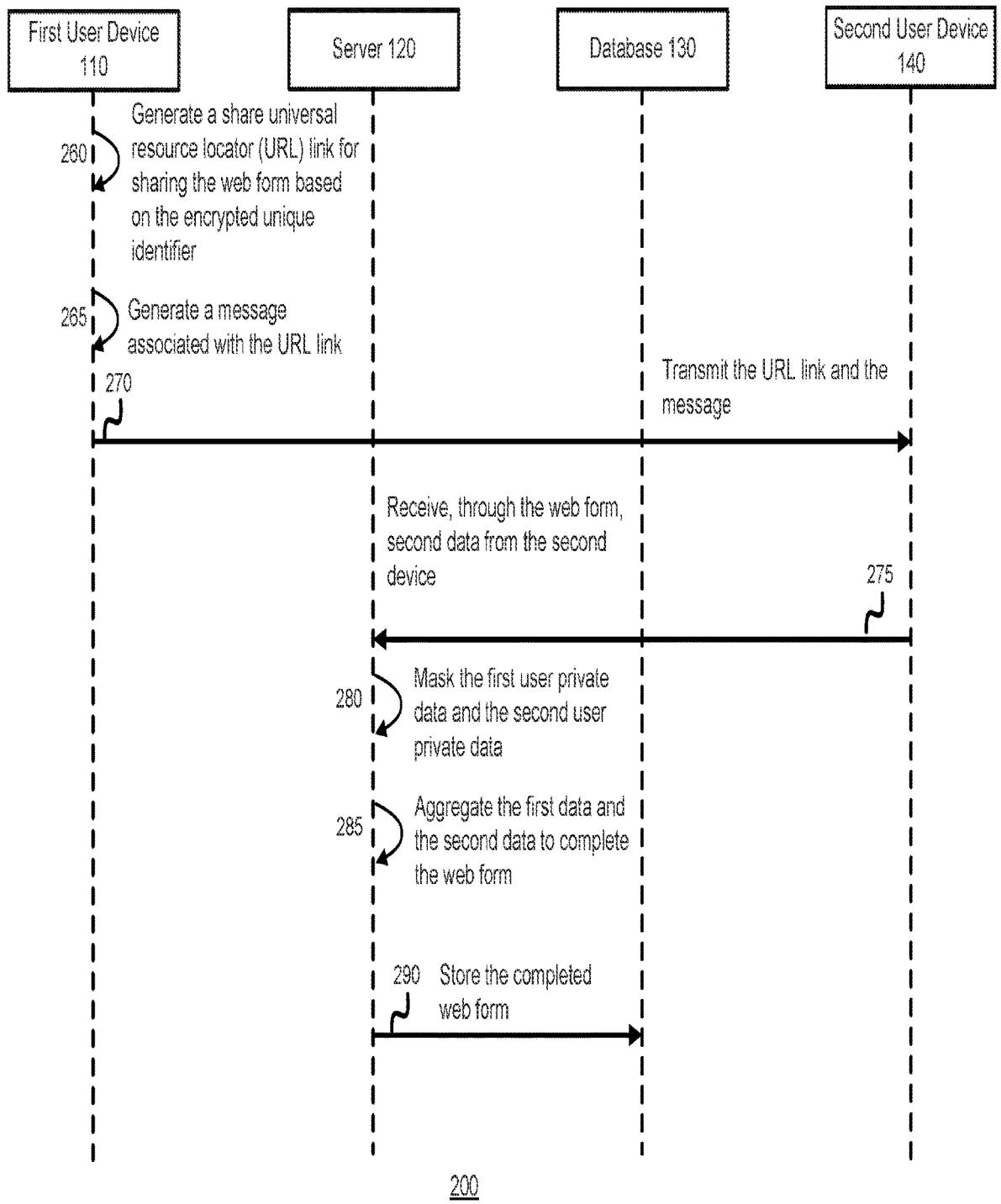
FIG. 2B is a sequence chart illustrating a method of web form data security according to an example embodiment.

FIG. 2B illustrates a continuation of sequence diagram 200 of data security for a web form according to an example embodiment. FIG. 2B may reference the same or similar components as those illustrated in FIG. 1, including a first user device, a server, a database, a second user device and a network.

In step 260, the first user device 110 may generate a share universal resource locator (URL) link for sharing the web form based on the encrypted unique identifier. With that unique identifier, the first user device 110 may use a share API included in a web browser installed on the first user device 110 to design and generate the URL link. For example, the unique identifier may be attached in the URL link for designating the web form.

In step 265, the first user device 110 may generate a message associated with the URL link. For example, the message may be "Could you please help with this application form?" or "Your information is needed, please provide the requested information").

In step 270, the first user device 110 may transmit the URL link and the message to the co-applicant through the second user device 140. The URL link and the message may be transmitted from the first user device 110 to the second user device 140 via a SMS message or an email.

In step 275, the server 120 may receive, through the web form, second data from the second user device 140. When the co-applicant receives the URL link and the message, the co-applicant may open the URL link via a web browser installed on the second user device 140, and start filling out the web form where his or her information is required. The server 120 maintains the established shared session valid between the first user device 110 and the second user device 140. The second data includes information entered in the web form by the co-applicant, such as the co-applicant's name, home address, date of birth, annual income, and so forth. The second data may include second user private data associated with the co-applicant. The second data is stored in the cache storage associated with the web form.

In step 280, the server 120 may mask the first user private data of the primary applicant and the second user private data of the co-applicant, such that the primary applicant cannot see the actual values of the second user private data while can see the co-applicant filling out the web form. Similarly, the co-applicant cannot see the actual values of the first user private data while can see the primary applicant filling out or editing the web form. In this way, the private data of both the primary applicant and the co-applicant is secured and protected, which also prevents fraud.

As described above, the server 120 creates the cache and the unique identifier to access that cache. So when the co-applicant starts filling out information on his or her version of the web form, the information of the co-applicant would be sent to the server 120, and stops at the server 120. Then the server 120 may just send to the first user device 110 a notification of what field and how many letters have been typed so that the primary applicant can see the masking as each response comes to the first user device 110. The primary applicant is able to at least see the starting of the mask. While the actual data associated with the co-applicant is not sent to the first user device, the primary applicant can still see that things are being typed on specific fields of the web form.

In step 285, the server 120 may aggregate the first data and the second data to complete the web form. After receiving and storing the first data and second data in the cache storage, the server 120 can finish the web form. In step 290, the server 120 may store the completed web form on the database 130 for further processing and analysis.

As described, the server 120 masks (e.g., using special characters such as asterisks, displaying only blank spaces, displaying random characters) both the first user private data of the primary applicant and the second user private data of the co-applicant, such that private data can be kept private. The server 120 would hold the information itself (the first user data and the second user data) so that once things are submitted, the server 120 would finish the web form and continue sending the completed web form to downstream services for further processing. Once the completed web form is sent to downstream services, the server 120 may delete the cache storage to clear the first user data and the second user data stored therein, further enhancing data security.

In some embodiments, the server 120 may store the first user data and the second user data in the cache storage for a predetermined period of time. For example, the URL link may expire after 24 hours from the time the primary applicant sent out the URL link to the co-applicant. As another example, the primary applicant can set a time period during the URL is active and after which the URL expires. Once the URL link expires, the server 120 may wipe out the cache storage. The primary applicant would have to start it over again with a new URL link. This can remind both the primary applicant and the co-applicant that the co-applicant has 24 hours to submit his or her information, otherwise the primary applicant and the co-applicant have to start over again.

In some embodiments, the share session between the first user device 110 and the second user device 140 may be a live session using either a data stream or a web socket through respective web browser installed on the first user device 110 and the second user device 140, which is capable of continually having an open connection between the first user device 110, the server 120, and the second user device 140.

Figure 3:
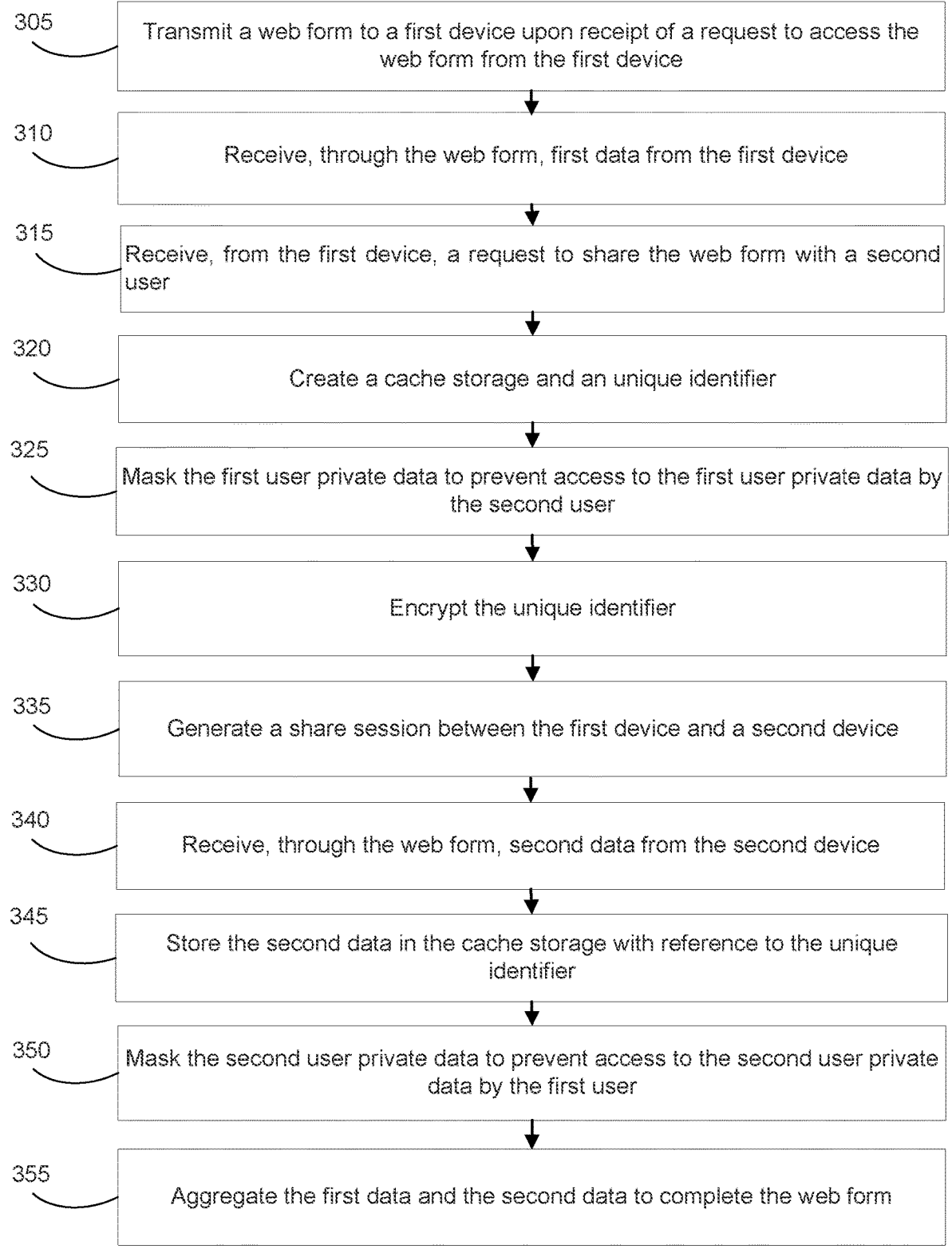
FIG. 3 is a flow chart illustrating a method of web form data security according to an example embodiment.

FIG. 3 illustrates a flow chart for a method 300 of web form data security and fraud prevention according to an example embodiment. FIG. 3 may reference the same or similar components as those illustrated in FIG. 1 and FIGS. 2A and 2B, including, a first user device, a server, a database, a second user device, and a network. The method 300 may be implemented in the system 100 and may comprise the following steps.

In step 305, the server 120 may transmits a web form to a first device (the first user device 110) upon receipt of a request to access the web form from the first device. For example, the primary applicant may visit a website for applying for an auto loan using a web browser installed on the first user device 110. The website may be hosted on the server 120. The primary applicant may click on an "apply" button on the website, in response to which, the server 120 can transmit to the first user device 110 a web application form.

In step 310, the server 120 may receive, through the web form, first data from the first user device 110. The primary applicant may enter his or her information (the first user data) on the web form through the web browser on the first user device 110. The first data include first user private data associated with the primary applicant.

In step 315, the server 120 may receive, from the first user device 110, a request to share the web form with a second user (the co-applicant). For example, the primary applicant may click on a button in the co-applicant part of the web form to trigger or initiate the request to share the web form with the co-applicant.

In step 320, the server 120 may create a cache storage and a unique identifier. The unique identifier associates the cache storage with the web form and the first data may be stored in the cache storage.

In step 325, the server 120 may mask the first user private data to prevent access to the first user private data by the co-applicant. The masking of the first user private data may be asterisks or the like, such that the co-applicant is unable to identify the true values of the first user private data.

In step 330, the server 120 may encrypt the unique identifier. The server 120 may use any suitable encryption algorithms to encrypt the unique identifier, for example, symmetric encryption and asymmetric encryption, and public key/private key encryption.

In step 335, the server 120 may generate a share session between the first user device 110 and the second user device 140. The second user device 140 is associated with the co-applicant who may use the second user device 140 to access the web form through the share session. The second user device 140 is deployed with a web browser on which the web form is displayed and edited.

In step 340, the server 120 may receive, through the web form, second data from the second user device 140. For example, the co-applicant fills out the web form by entering his or her information (the second data). The second data includes second user private data associated with the co-applicant.

In step 345, the server 120 may store the second data in the cache storage with reference to the unique identifier. The second data is not transmitted to the first user device 110.

In step 350, the server 120 may mask the second user private data to prevent access to the second user private data by the primary applicant. The masking of the second user private data may be asterisks or the like, such that the primary applicant is unable to identify the true values of the second user private data.

In step 355, the server 120 may aggregate the first data and the second data to complete the web form. After receiving and storing the first data and the second data, the server 120 may complete the web form and send the completed web form to downstream service for further processing.

In some embodiments, the web form is a loan application form, the first user is a primary loan applicant, and the second user is a secondary loan applicant.

In some embodiments, the first user device 110 includes a first web browser installed thereon. The web form is displayed on the first web browser. The first web browser includes a first web socket. The first data is received by the server 120 through the first web socket from the first user device 110. The second user device 140 includes a second web browser installed thereon. The web form is displayed on the second web browser. The second web browser includes a second web socket. The second data is received by the server 120 through the second web socket from the second user device 140.

In some embodiments, the first data is received by the server 120 as a first data stream through the first web browser from the first user device 110. The second data is received by the server 120 as a second data stream through the second web browser from the second user device 140.

In some embodiments, the first user device 110 may include a first mobile application. The web form is displayed on the first mobile application. The first data is received by the server 120 from the first user device 110 through the first mobile application. The second user device 140 may include a second mobile application. The web form is displayed on the second mobile application, and the second data is received by the server 120 from the second user device 140 through the second mobile application.

In some embodiments, the server 120 may generate an authentication code, and send the authentication code to the second user device 140. The co-applicant may access the web form on the second user device 140 using the authentication code. For example, after the co-applicant receives the URL link of the web form, a subsequent message with a code for a two-factor authentication may be generated by the server 120 and sent to the second user device 140. This additional layer of security can verify that the co-applicant is the person that the primary applicant is trying to allow access to the web form.

In some embodiments, the web form is shared between the first user (the primary applicant) and the second user (the co-applicant) for a predetermined period of time after which the share session, the first data and the second data stored in the cache storage, and the unique identifier are cleared.

FIG. 4 illustrates schematic of an example web form 400 (a refinance application form) according to an embodiment. FIG. 4 only shows two data fields in the primary applicant section and two data fields in the co-applicant section. An actual web form may include more other data fields.

As shown in FIG. 4, the primary applicant section includes a "Full Name" data field 410 and a "SSN" data field 420 in which the SSN of the primary applicant is masked so the true value of the SSN is not seen. The co-applicant section includes a "Full Name" data field 430 and a "SSN" data field 440 in which the SSN of the co-applicant is blank because, for example, the primary applicant does not know or remember the SSN of the co-applicant or because data field 440 has been designated for completion by the co-applicant. In addition, the co-applicant section also includes a "Share Form" button 450. When the primary applicant determines to share the web form with the co-applicant, the primary applicant can click on the button 450, whereby a shared link of the web form is created that can be sent by the primary applicant to the co-applicant through a SMS message or an email.

Figure 5:
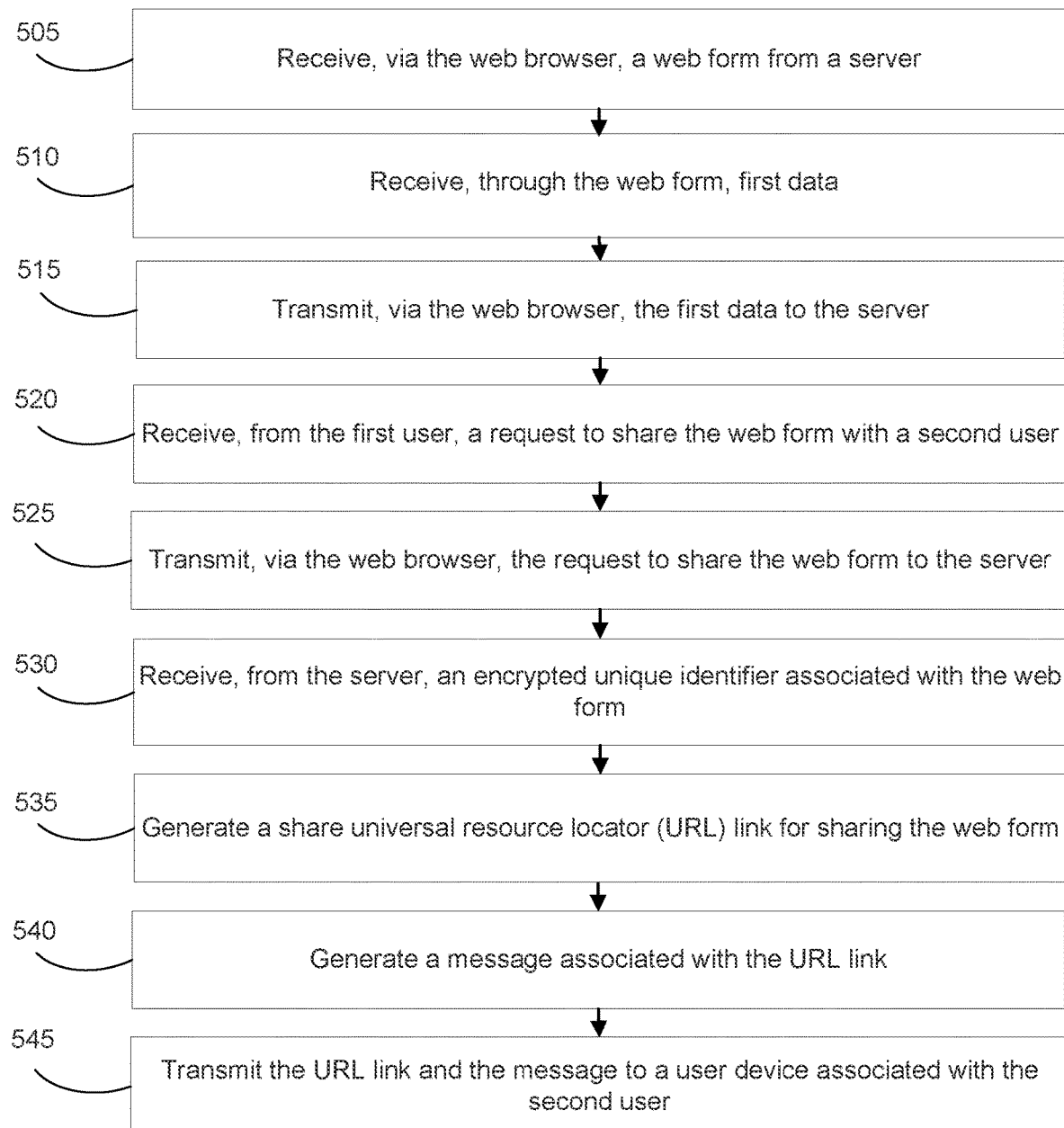
FIG. 5 is a flow chart illustrating a method of web form data security according to an example embodiment.

FIG. 5 illustrates a flow chart for a method 500 of web form data security and fraud prevention according to an example embodiment. FIG. 5 may reference the same or similar components as those illustrated in FIG. 1, FIGS. 2A and 2B, FIGS. 3 and 4 including, a first user device, a server, a database, a second user device, and a network. The method 500 may be implemented in the system 100 and may comprise the following steps.

In step 505, the first user device 110 may receive, via the web browser, a web form from a server (the server 120). The primary applicant may request the web form, for example, a refinance application form, from the server 120. Upon receipt of the request, the server 120 can transmit the web form to the first user device 110 associated with the primary applicant.

In step 510, the first user device 110 may receive, through the web form, first data. As described above, the primary applicant enters his or her information in the web form. The first data includes first user private data associated with the primary applicant.

In step 515, the first user device 110 may transmit, via the web browser, the first data to the server 120. The server 120 may store the first data in the cache storage.

In step 520, the first user device 110 may receive, from the first user (the primary applicant), a request to share the web form with a second user (the co-applicant). The primary applicant may click on the button in the web form (e.g., in FIG. 4) to share the web form with the co-applicant.

In step 525, the first user device may transmit, via the web browser, the request to share the web form to the server 120. In some examples this step can be performed by calling an application programming interface (API). For example, upon clicking on the button in the web form by the primary applicant, an API call to the server 120 may be initiated.

In step 530, the first user device 110 may receive, from the server 120, an encrypted unique identifier. The unique identifier is associated with the web form. As described above, upon receipt of the API call, the server 120 may create the cache storage and the unique identifier, and further encrypt the unique identifier.

In step 535, the first user device 110 may generate a share universal resource locator (URL) link for sharing the web form. The URL may be based on the encrypted unique identifier via a share API of the web browser.

In step 540, the first user device 110 may generate a message associated with the URL link, such as a SMS message or an email. The message may indicate a request to ask the co-applicant to complete the web form.

In step 545, the first user device 110 may transmit the URL link and the message to the second user device 140. The second user device is associated with the co-applicant. The URL link and the message are transmitted to the second user device via an email or a short message service (SMS) message.

In some embodiments, the first user device 110 and the second user device 140 may each comprise a mobile application including a web view widget. The web view widget is configured to display the web form. The URL link and the message are transmitted from the first user device 110 to the second user device 140 via a notification in the mobile application. The primary applicant and the co-applicant are authenticated via the mobile application.

In some embodiments, the first user device 110 may receive a notification from the server 120 when the web form is accessed by the second user (the co-applicant) and/or when the form or particular inputs are completed. The notification may indicate that the second user on the second user device 140 is sharing the web form with the first user (the primary applicant).

In some embodiments, the first user device 110 may receive a notification from the server 120 when a predetermined period of time has expired from transmitting the URL link and the message to the second user device 140 and the web form has not been accessed by the co-applicant.

FIG. 6 illustrates schematic of an example web form 600 (a refinance application form) according to an embodiment. FIG. 6 only shows two data fields in the primary applicant section and two data fields in the co-applicant section, however, it is understood that other forms may include additional data fields.

As shown in FIG. 6, the primary applicant section includes a "Full Name" data field 610 and a "SSN" data field 620 in which the SSN of the primary applicant is masked so the true value of the SSN is not seen. The co-applicant section includes a "Full Name" data field 630 and a "SSN" data field 640 in which the SSN of the co-applicant is masked so the true value of the SSN is not seen after the co-applicant enters his or her SSN. In addition, the co-applicant section also includes a "Share Form" button 650. When the primary applicant determines to share the web form with the co-applicant, the primary applicant can click on the button 650, whereby a shared link of the web form is created that can be sent by the primary applicant to the co-applicant through a SMS message or an email. After the co-applicant fills out the web form, this button may be deactivated (e.g., greyed out, removed from display).

After the server 120 completes the web form, the web form may be evaluated to see if the primary applicant is qualified for at least one offer, for example, a refinance loan or an auto loan. If the primary applicant is qualified, the server 120 may send to the first user device 110 at least one offer associated with the web form upon approval of the web form. The first user device 110 may receive the at least one offer associated with the web form from the server 120, generate a URL link for the at least one offer and a message associated with the at least one offer, and transmit the URL link for the at least one offer and the message to the second user device 140 for sharing the at least one offer with the co-applicant.

Conventionally, if a user wants to share their offer with another user, the user may have to perform significant work. For example, the use may have to switch between apps on their device to have the correct details or wait until they are in the same location to show their screen with another user. The user may also take a screen shot of the offer and send it by typing out an SMS message or email manually, which may introduce numerous errors. Further, if the user is considering multiple offers, the process may become even more cumbersome and time-consuming, and errors are increasingly likely. The system and method disclosed herein can allow a user to avoid these shortcomings and efficiently share one or more offers while maintain data security.

Figure 7:
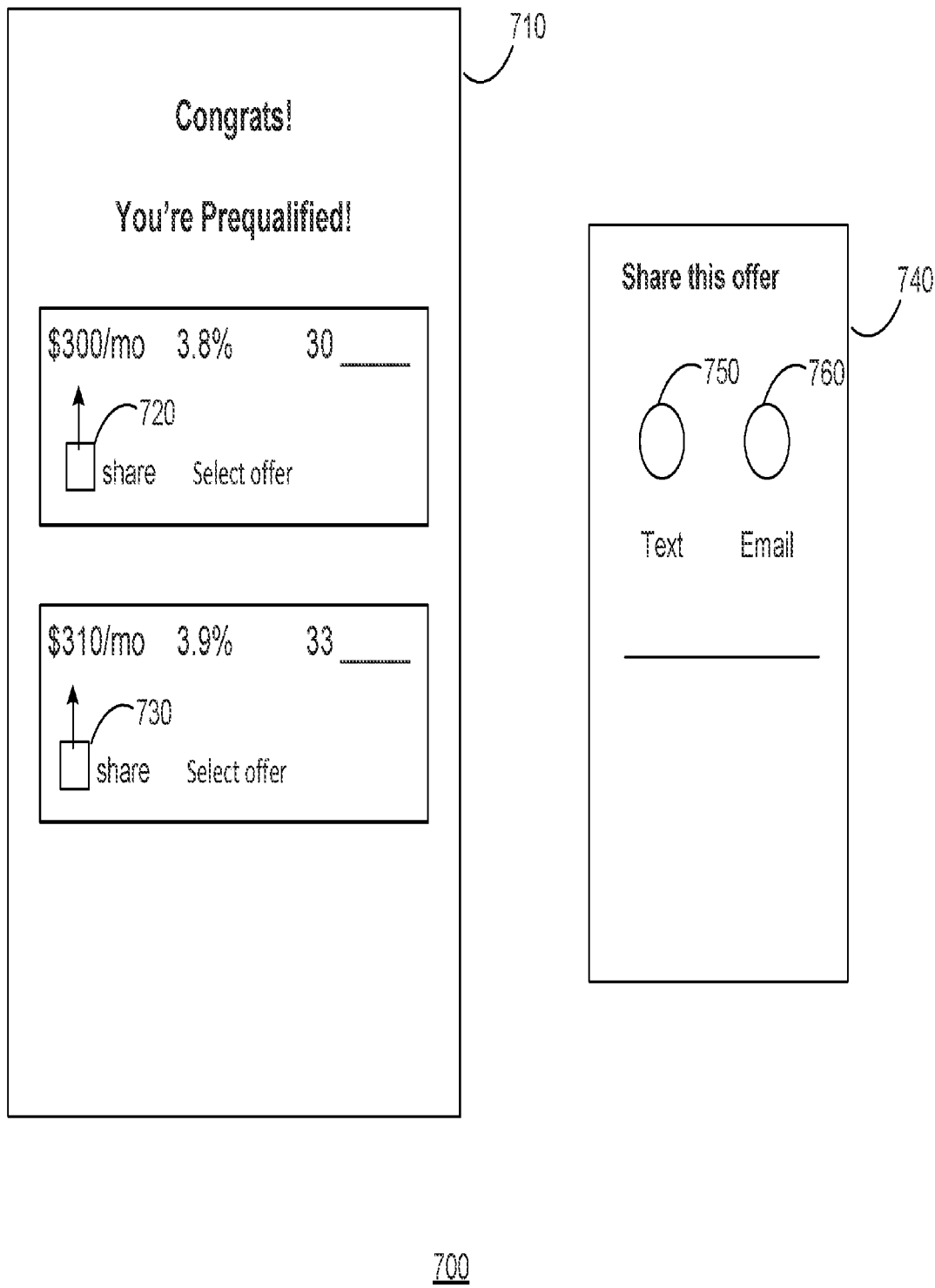
FIG. 7 is an example diagram illustrating an interface sharing offers according to an example embodiment.

FIG. 7 shows a display 700 including an interface 710 displaying two offers received by the primary applicant and displayed on the first user device 110. When the primary applicant wants to share one or both of the offers, the primary applicant can click on the button 720 and/or the button 730. Upon clicking on either button, a message box 740 may appear on the first user device 110. In the message box 740, the primary applicant is provided with two options: sharing the offer through a SMS message and an email. If the primary applicant wants to share the offer through the message, the primary applicant may click on the button 750 to automatically generate an URL link of the offer and associated text that can be transmitted to the second user device 140 associated with the co-applicant. If the primary applicant wants to share the offer through the email, the primary applicant may click on the button 760 to automatically generate an URL link of the offer and associated email message that can be transmitted to the second user device 140 associated with the co-applicant.

Figure 8:
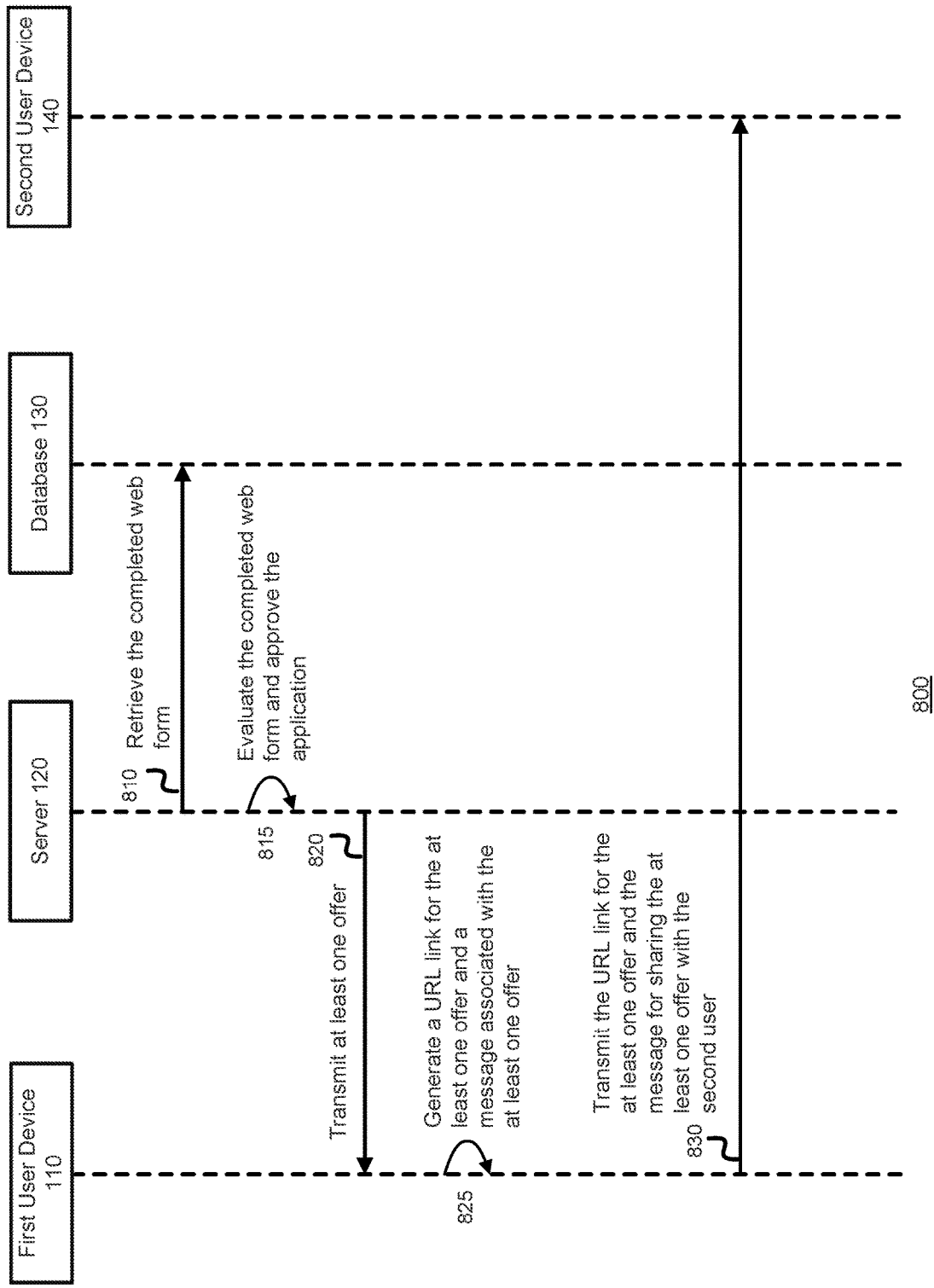
FIG. 8 is a sequence chart illustrating a method of sharing offers according to an example embodiment.

FIG. 8 illustrates a sequence diagram 800 of data security for sharing at least one offer according to an example embodiment. FIG. 800 may reference the same or similar components as those illustrated in FIGS. 1-7, including a first user device, a server, a database, a second user device and a network.

In step 810, the server 120 may retrieve the completed web form from the database 130. As described above, when the server finishes the web form, the first data and the second data are cleared from the cache storage.

In step 815, the server 120 may evaluate the completed web form and approve the application. For example, the first data and the second data entered into the web form may be compared with information of other applicants to determine whether the primary applicant is qualified for one or more offers.

In step 820, the server 120 may transmit one or more offers to the first user device 110 if the primary applicant is determined to be qualified for the one or more offers, such as the two offers shown in FIG. 7.

In step 825, the first user device 110 may generate a URL link for the at least one offer and a message associated with the at least one offer to share the at least one offer with the co-applicant, as shown in FIG. 7.

In step 830, the first user device 110 may transmit the URL link for the at least one offer and the message for sharing the at least one offer with the co-applicant, as shown in FIG. 7.

In some embodiments, the communications between the first user device 110, the server 120 and the second user device 140 may be encrypted to further enhance data security.

In some examples, exemplary procedures in accordance with the present disclosure described herein may be performed by a processing arrangement and/or a computing arrangement (e.g., computer hardware arrangement). Such processing/computing arrangement may be, for example entirely or a part of, or include, but not limited to, a computer/processor that may include, for example one or more microprocessors, and use instructions stored on a computer-accessible medium (e.g., RAM, ROM, hard drive, or other storage device). For example, a computer-accessible medium may be part of the memory of the first user device 110, the server 120, and/or the second user device 140 or other computer hardware arrangement.

In some examples, a computer-accessible medium (e.g., as described herein above, a storage device such as a hard disk, floppy disk, memory stick, CD-ROM, RAM, ROM, etc., or a collection thereof) may be provided (e.g., in communication with the processing arrangement). The computer-accessible medium may contain executable instructions thereon. In addition or alternatively, a storage arrangement may be provided separately from the computer-accessible medium, which may provide the instructions to the processing arrangement so as to configure the processing arrangement to execute certain exemplary procedures, processes, and methods, as described herein above, for example.

Throughout the disclosure, reference is made to online forms, including online web forms, for a variety of purposes, including for an auto loan application, a refinance application, or a home mortgage application. It is understood that the present disclosure is not limited to a particular type of form or a form for a particular transaction, and the present disclosure includes any type of form used for any type of transaction and also includes other collaborative editing purposes.

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for data security and fraud prevention, comprising:
   receiving, by a server through a web form, first data, wherein the first data includes first user private data associated with a first user;
   creating, by the server, a cache storage and a unique identifier, wherein the unique identifier associates the cache storage with the web form and the first data is stored in the cache storage;
   receiving by the server, a request to share the web form with a second user;
   masking, by the server, the first user private data to prevent access to the first user private data by the second user;
   generating, by the server, a share session between the first device and a second device, wherein the second device is associated with the second user;
   receiving, by the server through the web form, second data, wherein the second data includes second user private data associated with the second user;
   storing, by the server, the second data in the cache storage with reference to the unique identifier;
   masking, by the server, the second user private data to prevent access to the second user private data by the first user; and
   aggregating, by the server, the first data and the second data to complete the web form.

2. The method of claim 1, further comprising transmitting the web form from the server to a first device upon a request to access the web form, wherein the web form comprises a loan application form.

3. The method of claim 1, further comprising encrypting, by the server, the unique identifier.

4. The method of claim 1, wherein the first user is a primary loan applicant, and
   the second user is a secondary loan applicant.

5. The method of claim 1, wherein:
   the first device includes a first web browser installed thereon, the web form being displayed on the first web browser, the first web browser including a first web socket, and the first data being received through the first web socket from the first device, and
   the second device includes a second web browser installed thereon, the web form being displayed on the second web browser, the second web browser including a second web socket, the second data being received through the second web socket from the second device.

6. The method of claim 1, wherein:
   the first device includes a first web browser installed thereon, the web form being displayed on the first web browser, the first data being received as a first data stream through the first web browser from the first device, and
   the second device includes a second web browser installed thereon, the web form being displayed on the second web browser, the second data being received as a second data stream through the second web browser from the second device.

7. The method of claim 1, wherein:
   the first device includes a first mobile application,
   the web form is displayed on the first mobile application,
   the first data is received from the first device through the first mobile application,
   the second device includes a second mobile application,
   the web form is displayed on the second mobile application, and
   the second data is received from the second device through the second mobile application.

8. The method of claim 1, further comprising:
   generating, by the server, an authentication code, and
   sending, by the server, the authentication code to the second device;
   wherein the web form is accessed on the second device using the authentication code.

9. The method of claim 1, wherein the web form is shared between the first user and the second user for a predetermined period of time after which the share session, the first data and the second data stored in the cache storage, and the unique identifier are cleared.

10. The method of claim 1, further comprising sending, by the server to the first device, at least one offer associated with the web form upon approval of the web form.

11. The method of claim 1, further comprising transmitting, by the server, the first data and the second data to subsequent services for further processing.

12. A device comprising:
   a processor in communication with a server;
   a memory for storing instructions executable by the processor; and
   a web browser,
   wherein the processor, upon execution of the instructions stored in the memory, is configured to:
     receive, from a first user through a web form, first data, the first data including first user private data associated with a first user,
     receive, from the first user, a request to share the web form with a second user,
     receive, from the server, an encrypted unique identifier, wherein the encrypted unique identifier is created from a unique identifier, created by the server and wherein the unique identifier associates a cache storage with the web form and the first data is stored in the cache storage, generate a share universal resource locator (URL) link for sharing the web form based on the encrypted unique identifier via a share API of the web browser, transmit the URL link and a message associated with the URL link to a user device, wherein the user device is associated with the second user, receive, through the web form, second data, wherein the second data includes second user private data associated with the second user, and store the second data in the cache storage with reference to the unique identifier.

13. The device of claim 12, wherein the processor is further configured to receive, via the web browser, the web form from the server, wherein the web form comprises a loan application form.

14. The device of claim 12, wherein the processor is further configured to transmit, via the web browser, the first data to the server.

15. The device of claim 12, wherein the processor is further configured to transmit, via the web browser, the request to share the web form to the server by calling an application programming interface (API).

16. The device of claim 12, wherein:
the web form includes a button, and
the request to share the web form is generated by clicking on the button.

17. The device of claim 12, wherein the processor is further configured to receive masked private data associated with the second user via the server from the user device, wherein actual values of the masked private data associated with the second user is inaccessible to the first user.

18. The device of claim 12, wherein the processor is further configured to:
receive at least one offer associated with the web form from the server after the web form is completed and approved,
generate a URL link for the at least one offer and a message associated with the at least one offer, and
transmit the URL link for the at least one offer and the message to the user device for sharing the at least one offer with the second user.

19. A data security and fraud prevention system, comprising:
a processor;
a memory storing instructions executable by the processor;
the processor, upon execution of the instructions, being configured to:
receive, through a web form, first data from a first device, the first data including first user private data associated with a first user, wherein the web form comprises a loan application form,
receive, from the first device, a request to share the web form with a second user,
create a cache storage and a unique identifier, wherein the unique identifier associates the cache storage with the web form and the first data is stored in the cache storage,
mask the first user private data to prevent access to the first user private data by the second user,
generate a share session between the first device and a second device, wherein the second device is associated with the second user,
receive, through the web form, second data from the second device, wherein the second data includes second user private data associated with the second user,
store the second data in the cache storage with reference to the unique identifier;
mask the second user private data to prevent access to the second user private data by the first user, and
aggregate the first data and the second data to complete the web form.

* * * * *